(12) United States Patent
Van Patten et al.

(10) Patent No.: US 7,641,880 B2
(45) Date of Patent: Jan. 5, 2010

(54) ROOM TEMPERATURE SYNTHESIS OF GAN NANOPOWDER

(75) Inventors: Paul Gregory Van Patten, Athens, OH (US); Guiquan Pan, Athens, OH (US)

(73) Assignee: Ohio University, Athens, OH (US)

( * ) Notice: Subject to any disclaimer, the term of this patent is extended or adjusted under 35 U.S.C. 154(b) by 444 days.

(21) Appl. No.: 11/416,545

(22) Filed: May 3, 2006

(65) Prior Publication Data

US 2007/0297969 A1    Dec. 27, 2007

(51) Int. Cl.
  C01B 21/06    (2006.01)
  C01B 21/076   (2006.01)
  C01B 21/072   (2006.01)

(52) U.S. Cl. .................. 423/409; 423/411; 423/412

(58) Field of Classification Search ............. 423/409, 423/411, 412
  See application file for complete search history.

(56) References Cited

U.S. PATENT DOCUMENTS

| | | | | |
|---|---|---|---|---|
| 4,798,701 A | * | 1/1989 | David | 420/528 |
| 5,110,768 A | * | 5/1992 | Kaner et al. | 501/1 |
| 6,096,282 A | * | 8/2000 | Kaner et al. | 423/409 |
| 6,120,748 A | * | 9/2000 | Kaner et al. | 423/290 |
| 6,207,844 B1 | | 3/2001 | Kouvetakis et al. | |

FOREIGN PATENT DOCUMENTS

WO    WO 2005/049711    6/2005

OTHER PUBLICATIONS

Cheng, Q.M. et al. A study of the thermal properties and the solid state pryolysis of the Lewis acid/base adducts [X3MN(SnMe3)3] (X=Cl, Br; M=Al, Ga, In) and [Cl2MeMN(SnMe3)3] (M=Al, Ga) as molecular precursors for group 13 nitride materials. J of Material Chem. 2002, vol. 12, p. 2470-2474.

Benaissa, M. et al. "Nanostructured GaN: Microstructure and Optical Properties", Physical Review B, vol. 54, No. 24, pp. 17763-17767, Dec. 15, 1996.

Brus, LE "Electron-electron and electron-hole interactions in small semiconductor crystallites: The size dependence of the lowest excited electronic state", J. Chem. Phys 80 (9), pp. 4403-4409, May 1, 1984.

Coffer, J.L. et al., "Influence of Precursor Route on the Photoluminescense of Bulk Nanocrystalline Gallium Nitride", Chem. Mater. 9, pp. 2671-2673, 1997.

Cumberland, RW et al., "Thermal Control of Metathesis Reactions Producing GaN and InN", J. Phys. Chem B, 105, pp. 11922-11927, 2001.

Gonsalves, KE et al., "Optical and microstructural characterization of chemically synthesized gallium nitride nanopowders", Appl. Phys. Lett 71(15), pp. 2175-2177, Oct. 13, 1997.

(Continued)

*Primary Examiner*—Wayne Langel
(74) *Attorney, Agent, or Firm*—Calfee, Halter and Griswold LLP

(57) ABSTRACT

In the direct production of GaN by the metathesis of $Li_3N$ and $GaCl_3$ or $GaBr_3$ or $GaI_3$, the reaction rate and yields can be greatly enhanced by including diethyl ether in the reaction system.

18 Claims, 4 Drawing Sheets

OTHER PUBLICATIONS

Grocholl, L et al., "Solvothermal Azide Decomposition Route to GaN Nanoparticles, Nanorods, and Faceted Crystallites", Chem. Mater. 13, pp. 4290-4296, 2001.

Hwang, JW et al., "Topochemical Control in the Solid-State Conversion of Cyclotrigallazane into Nanocrystalline Gallium Nitride", Chem. Mater. 7, pp. 517-525, 1995.

Janik, JF et al., "Gallium Imide, {Ga(NH)3/2}m a New Polymeric Precursor for Gallium Nitride Powders", American Chemical Society, 4 pgs., 1996.

Jung, WS et al. "Reaction intermediate(s) in the conversion of β-gallium oxide to gallium nitride under a flow of ammonia", Materials Letters 57, pp. 110-114, Nov. 2002.

Liu, HL et al. "Infrared and Raman-scattering studies in single-crystalline GaN nanowires", Chemical Physics Letters 345, pp. 245-251, Sep. 14, 2001.

Micic, OI et al., "Synthesis, structure, and optical properties of colloidal GaN guantum dots", Applied Physics Letters, vol. 75, No. 4, pp. 478-480, Jul. 26, 1999.

Mueller, AH et al., "Multicolor Light-Emitting Diodes Based on Semiconductor Nanocrystals Encapsulated in GaN Charge Injection Layers", Nano Letters, vol. 5, No. 6, pp. 1039-1044, 2005.

Murray, CB et al., "Syntehsis and Characterization of Monodisperse Nanocrystals and close-packed nanocrystal Assemblies", Annu. Rev. Mater. Sci., 30, pp. 545-610, 2000.

Sardar, K et al., "New Solvothermal Routes for GaN Nanocrystals", Advanced Materials, 16, No. 5, pp. 425-429, Mar. 5, 2004.

Sardar, K et al., "A Simple single-source precursor route to the nanostructures of Aln, GaN and InN", J. of Materials Chemistry, vol. 15, pp. 2175-2177, 2005.

Trodahl, HJ et al., "Raman Spectroscopy of nanocrystalline and amorphous GaN", J. of Applied Physics, 97, 084309-1 through 084309-5, 2005.

Wallace, CH et al, "Solid-state metathesis reactions under pressure: A rapid route to crystalline gallium nitride" Applied Physics Letters, vol. 72, No. 5, pp. 596-598, Feb. 2, 1998.

Wallace CH et al "Rapid Synthesis of Crystalline Gallium Nitride from Solid Precursors at Atmospheric Pressure" American Chemical Society, vol. 11, No. 9, pp. 2299-2301, 1999.

Wang, J et al., "Facile Azidothermal Metathesis Route to Gallium Nitride Nanoparticles", Nano Letters, vol. 2, No. 8, pp. 899-902, plus three (3) supplemental pages, 2002.

Webster's Ninth New Collegiate Dictionary, Period Table of Elements, p. 874, Merriam-Webster, Inc., 1985.

Wells, RL et al., "Heterogeneous solution reactions between MBr3 (M=Ga, In) and Li3N. Formation and characterization of nanocrystalline GaN powders", Eur. J. Solid State Inorg. Chem., 33, pp. 1079-1090, 1996.

Xie, Y et al., "A Benzene-Thermal Synthetic Route to Nanocrystalline GaN", Science, vol. 272, pp. 1926-1927, Jun. 28, 1996.

Xie, Y et al., "Coexistence of wurtzite GaN with zinc blende and rocksalt studied by x-ray power diffraction and high-resolution transmission electron microscopy", Appl. Phys Lett. 69 (3), pp. 334-336, Jul. 15, 1996.

Xu, F et al., "Single-Crystalline Gallium Nitride Microspindles: Synthensis, Charadcterization, and Thermal Stability", Adv. Funct. Mater. 14, No. 5, pp. 464-470, May 2004.

Zhang J. et al., "Morphology and Raman scattering spectrum of GaN nanowires embedded in nanochannels of template", J. Phys D. Appl. Phys. 35, pp. 1481-1485, 2002.

Zhao, H et al., "Route to GaN and VN Assisted by Carbothermal Reduction Process", J. Am. Chem. Soc. 127, pp. 15722-15723, 2005.

Pan, G. et al., "A New Pyrolysis Route to GaN Quantum Dots", Chem. Mater., 13, 4 pages, 2005.

Pan G. et al., "Room Temperature Synthesis of GaN Nanopowder", Chem. Mater. 14, 4 pages, 2006.

Science Blog, "Novel multi-color light-emitting diodes developed", by BJS, created May 18, 2005, 2 pages, from http://www.scienceblog.com/cms/node/7935/print.

Los Alamos National Laboratory, "Scientists develop novel multi-color light emitting diodes", May 17, 2005, 2 pages, from http://lanl.gov/news/index.php?fuseaction=home.story&story_id=6597&view=print.

Physorg.com, "Scientists develop novel multi-color light-emitting diodes", May 18, 2005, 2 pages, from http://physorg.com/news4152.html.

Science Daily, "Scientists Develop Novel Multi-color Light-emitting Diodes", May 18, 2005, 2 pages, from http://www.sciencedaily.com/print.php.

* cited by examiner

ROOM TEMPERATURE SYNTHESIS OF GAN NANOPOWDER

ACKNOWLEDGMENT

The work described here was supported by the National Science Foundation under Grant No. (ECS-0210216).

BACKGROUND

The present invention relates to producing gallium nitride (GaN) by the metathesis of $Li_3N$ and a trivalent gallium compound such as $GaCl_3$, $GaBr_3$, or $GaI_3$. Because this reaction is highly exothermic, decomposition of the product into elemental Ga and $N_2$ normally occurs, thereby reducing yields.

To deal with this problem, it has already been proposed to carry out the reaction in the presence of high pressure nitrogen. For example, Kaner and coworkers found that, by applying high pressure (4.5 GPa), they could suppress evolution of $N_2$ gas from the reaction of $GaI_3$ and $Li_3N$ and produce GaN in 87% yields. See, Wallace et al., *Appl. Phys. Lett.* 1998, 72, 596. However, high pressures limit the scale of the reaction to producing minute quantities of product as a practical matter.

Another approach for controlling decomposition in this reaction has been to add a substance that acts as a heat sink. For example in a subsequent study, Kaner and coworkers performed this reaction in the presence of $NH_4Cl$ and/or $LiNH_2$ additives. See, Wallace et al., *Chem. Mater.* 1999, 11, 2299; and Cumberland et al., *J. Phys. Chem. B* 2001, 105, 11922. Similarly, Xie and coworkers studied the reaction of $GaCl_3$ with $Li_3N$ in an organic solvent such as benzene near its critical point. See, Xie et al., *Appl. Phys. Lett.* 1996, 69, 334; and Xie et al., *Science* 1996, 272, 1926. After 6-12 hours, dark gray, nanocrystalline GaN powder was recovered. While these approaches limited decomposition of the GaN product, they also significantly reduced reaction rates and yields to unacceptably low levels.

In still another approach, Wells and Janik studied the reaction between $GaBr_3$ and $Li_3N$ in refluxing diglyme and xylene. See, Wells et al., *Eur. J. Solid. State Inorg. Chem.* 1996, 33, 1079. However, product yields obtained after 80 hours were low and, moreover, the powdered product obtained was highly contaminated with elemental gallium.

SUMMARY OF THE INVENTION

In accordance with the invention, it has now been discovered that the reaction rate and yields in the production of GaN or analogous compounds by the metathesis of $Li_3N$ and $GaCl_3$, $GaBr_3$, or $GaI_3$ can be greatly enhanced by including diethyl ether or an analogous liquid accelerant in the reaction system.

Thus, the present invention provides a new process for producing a metal nitride product by the metathesis of a metal nitride reactant and a reactant salt of a monovalent anion and the metal forming the metal nitride product, the metal nitride reactant and the reactant salt being at least partially dissolved in a liquid reaction medium, wherein the metal forming the metal nitride product is selected from Groups IIIA, IIIB, IVB, VB and VIB of the Periodic Table while the metal forming the metal nitride reactant is selected from Groups IA and IIA of the Periodic Table, wherein the liquid reaction medium includes a liquid accelerant comprising an ether having a single ether moiety, an ether having multiple ether functionalities in which adjacent ether groups are separated by at least 4 carbon atoms, or mixtures thereof.

BRIEF DESCRIPTION OF THE DRAWINGS

The present invention may be more readily understood by reference to the following drawings wherein.

DETAILED DESCRIPTION

Figure 1:
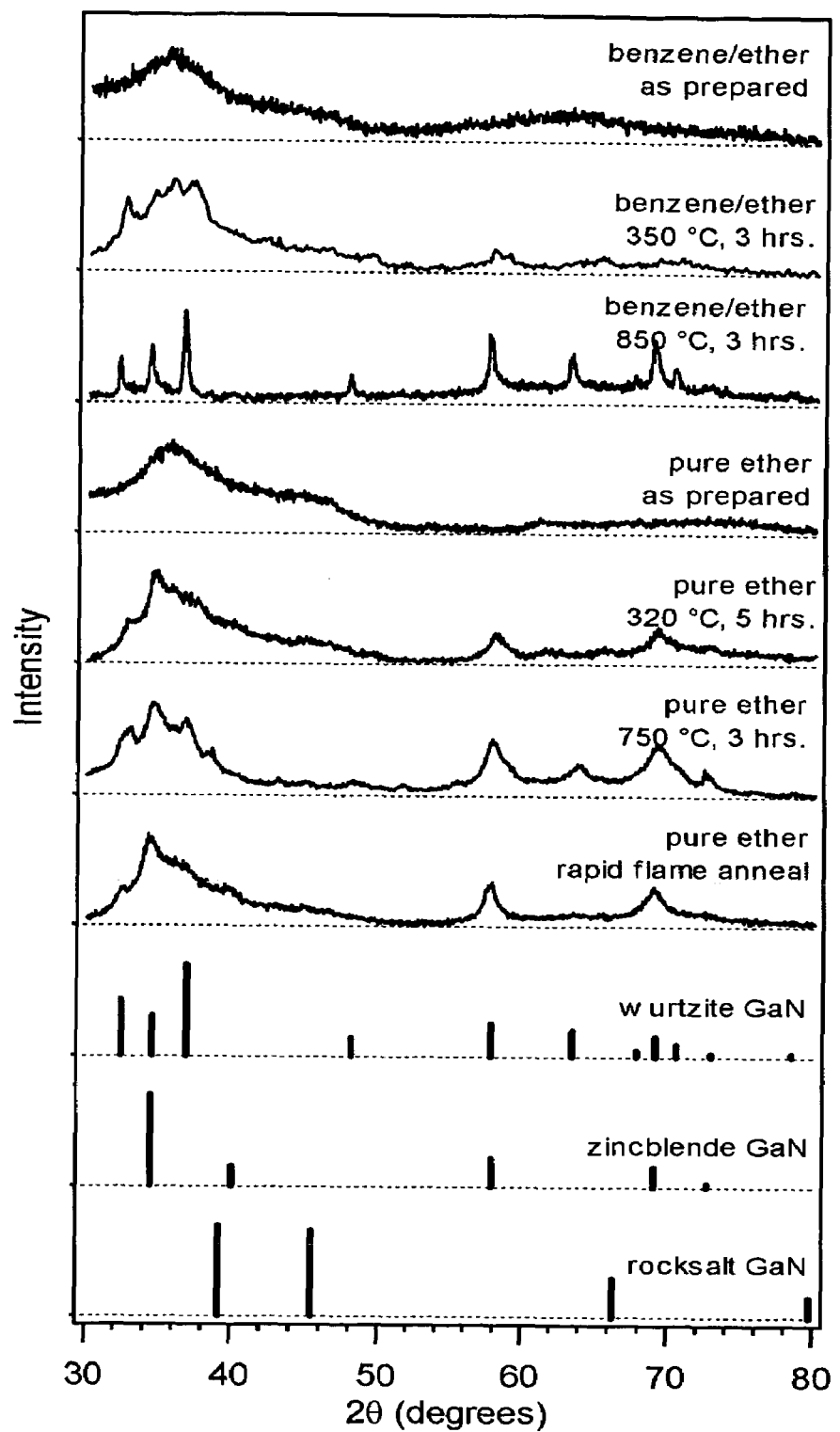
FIG. 1 is a compilation of X-ray diffraction patterns of GaN nanopowders prepared in accordance with the present invention which shows the effect of various different annealing conditions on these powders.

In accordance with the invention, a metal nitride product, such as GaN, is synthesized by the metathesis of a metal nitride reactant, such as $Li_3N$, and a salt of a monovalent anion and the metal forming the metal nitride product, such as $GaCl_3$, $GaBr_3$, or $GaI_3$, in a liquid reaction medium which contains an ether as an accelerating agent. Surprisingly, addition of the ether greatly accelerates the reaction whereby complete reaction can be achieved within hours at room temperature.

Reactants

The primary focus of this invention is in the manufacture of GaN. For this purpose lithium nitride, $Li_3N$, will normally be used as the metal nitride reactant and gallium chloride, $GaCl_3$, gallium bromide, $GaBr_3$, or gallium iodide, $GaI_3$, will normally be used as the reactant salt. Analogous compounds can also be used, however.

For example instead of $Li_3N$, other reactive metal nitrides such as Group IA and Group IIA metal nitrides and in particular sodium nitride, potassium nitride, cesium nitride, barium nitride, magnesium nitride and calcium nitride can be used as the metal nitride reactant. In this context, "Group IA" and the other "Groups" mentioned herein refer to the groups of elements in the Periodic Table of the Elements found on page 874 of *Webster's Ninth New Collegiate Dictionary*, © 1985, Merriam-Webster, Inc.

Similarly instead of $GaCl_3$, $GaBr_3$, or $GaI_3$, other reactive salts of trivalent gallium and a monovalent anion can be used provided that (1) they are at least slightly soluble in the liquid reaction medium being used, (2) the coordination bond between the anion of the salt and the gallium III ion is weak enough so that the Ga ion can react with the nitride and (3) the anion does not interfere with the nitriding process such as, for example, by reacting with the nitride anion. Specific examples of such reactive trivalent gallium salts include the other gallium halides such as gallium bromide and gallium fluoride as well as salts of gallium and other monoatomic or polyatomic anions such as gallium sulfate, gallium hydroxide, gallium acetate, gallium citrate, gallium acetylacetonate, gallium toluenesulfonate, and organogallium compounds such as trimethylgallium and triethylgallium.

In addition to gallium nitride, nitrides of other Group III metals, e.g., aluminum (III) nitride, indium (III) nitride, boron nitride, thallium nitride, scandium nitride, yttrium nitride, actinium nitride as well as nitrides of the rare earth elements (lanthanide and actinide series) such CeN, EuN, SmN, TbN, GdN, ThN, DyN, ErN, can also be produced by the inventive process. Similarly, nitrides of the Group IVB, VB and VIB transition metals such as the nitrides of Ti, Zr, V, Nb, Ta, Cr, Mo and W can also be made by the inventive process. If so, analogous starting materials can be used. For example, aluminum (III) chloride or iodide and indium (III) chloride or iodide can be used to make the corresponding aluminum and indium nitrides. Similarly, the appropriate transition metal chlorides or rare-earth metal chlorides can be used to make the corresponding transition metal or rare-earth metal nitrides.

The proportions of the reactants used in the inventive process can vary widely and basically any amounts can be used. Generally, enough reactants should be used so that the molar ratio of the Ga (or analogous metal) to nitride nitrogen (e.g., the "N" in $Li_3N$) will be about 10:1 to 1:10, more typically about 0.3:1 to 1:0.3. Molar ratios of about 1:1, however, seem to provide highly luminescent products, which is indicative of high material quality and good electronic properties.

Liquid Medium

The inventive process is a liquid phase reaction in which the reactants should at least partially dissolve in the liquid phase. This means that the solubility of each reactant (i.e., both the reactant metal nitride and the reactant salt) in the liquid reaction medium should be at least about 0.0001 moles per liter. More typically, the solubility of each reactant in the liquid reaction medium will be at least about 0.01 moles per liter, or even about 0.1 moles per liter or more.

Most conveniently this can be done by carrying out the reaction in a liquid medium composed entirely of the liquid accelerant of the invention, as further discussed below. This can also be done by carrying out the reaction in a liquid medium composed of a mixture of this liquid accelerant and a capping agent, as also discussed below. Alternatively, the inventive process can also be carried out in an inert liquid medium, i.e., a liquid which is unreactive with all ingredients and products and which also has no effect on rate of the inventive reaction.

Suitable inert liquids for this purpose are those which do not react to any significant degree with the reactants or products of the inventive reaction, which are liquid at the reaction temperature employed and which are capable of at least partially dissolving the reactants. Particular examples include various organic liquids such as, for example, $C_6$-$C_{40}$ hydrocarbons both saturated and unsaturated such as $C_6$-$C_{40}$ alkanes, alkenes and aromatic compounds such as benzene, toluene, xylene, phenol and derivates thereof, whether unsubstituted or substitute with non-reactive substituents such as chloro, bromo, fluoro, etc., primary, secondary and tertiary alkyl amines having molecular weights of about 70 to 500 Daltons (e.g. trioctylamine, hexadecyl amine) and alkyl phosphines having molecular weights of about 100 to 600 Daltons (e.g. trioctylphosphine).

Liquid Accelerant

In accordance with the invention, it has been found that the speed (i.e., rate) at which the inventive metathesis reaction occurs can be greatly enhanced if a particular liquid accelerant is included in the reaction system. Most commonly, the liquid accelerant will be diethyl ether. However analogous compounds can also be used. Examples are other $C_2$-$C_{30}$ ethers such as dialkyl ethers, e.g., dimethyl ether, methyl ethyl ether, dipropyl ether, dibutyl ether, butyl hexyl ether, etc., diaryl ethers such as dibenyzl, xylyl benzyl ether, etc., alkyl aryl ethers such as benzyl butyl ether, etc. These ethers may be unsubstituted, mono-substituted, or poly-substituted with non-reactive substituents such as halo (e.g., chloro, bromo, fluoro), nitro, hydroxy, alkoxy, ester, aldehyde, ketone, amino, etc.

Ethers with multiple ether functionalities can also be used. In this case, however, it is desirable that adjacent ether groups be separated by at least four and preferably five or more carbon atoms. This is because multifunctional ethers in which adjacent ether groups are closer together such as diglyme and triglyme show only limited accelerating ability, if any.

As indicated below, the speed (rate) of the metathesis reaction is normally affected by reaction temperature, with higher temperatures promoting faster reaction times. Higher reaction temperatures may also promote beneficial annealing of the product GaN nanocryals, as further discussed below. Therefore, it may be desirable to choose a higher boiling liquid accelerant for a particular embodiment of the inventive process, depending on the reaction times and/or product quality desired. However, not all ethers provide the same accelerating activity. Therefore, the advantage to be obtained by a higher reaction temperature may be negated by the disadvantage realized by a diminished accelerating activity. In practice, this means that care must be taken in selecting the particular liquid accelerant to be used in a particular embodiment of the invention to strike an appropriate balance between reaction temperature and other desired features.

Any amount of liquid accelerant that can be used in the inventive process, although normally enough will be used to exhibit a noticeable positive effect on the rate at which the inventive reaction occurs. Usually, this means that the reaction system will contain at least about 0.1 wt. % liquid accelerant, based on the weight of the entire reaction system. Concentrations on the order of about 1 to 90 wt. %, or even 1 to 20 wt. % are more typical.

As of this writing, the mechanism by which the liquid accelerant affects the inventive metathesis reaction is unknown. The $Li_3N$ precursor is not well dissolved in many liquid accelerants including diethyl ether and by benzene/diethyl ether mixtures. The ether liquid accelerant demonstrably accelerates the reaction, and this acceleration may be due to complexation of the ether with the trivalent gallium reactant (e.g., $GaCl_3$) to produce a species with enhanced reactivity toward the nitride reactant (e.g., $Li_3N$). The catalytic effects of the ether could also be connected to interactions between the ether and Li ions at the $Li_3N$ particle surface. Interactions between Li and oxygen lone pair electrons might facilitate Li—N bond cleavage, thus activating the nitride toward attack by $Ga^{3+}$. The limited solubility of $Li_3N$ means that the reaction is likely a surface process. Whether the nascent GaN particle remains at the $Li_3N$ surface after Ga—N bond formation, and for how long, remains unclear. Nevertheless, it seems likely that the $Li_3N$ particle size influences the reaction rate.

Capping Ligands

As the inventive metathesis reaction proceeds, GaN particles are formed. Initially, these particles are small but they may grow or agglomerate as the reaction proceeds. In order to hinder particle agglomeration and growth, an optional capping ligand can be included in the reaction system, if desired.

Any organic chemical which will not boil off at the reaction temperature used and which will attach to the surfaces of the nascent GaN particles, thus preventing or retarding contact between these particles and additional particles and/or additional reactants, can be used for this purpose. Examples are Lewis bases, since they form bonds of moderate strength with metals such as the Ga of the GaN particles. Specific examples include thiols, amines, amides, alcohols, diols, disulfides, aldehydes, ketones and carboxylic acid derivatives such as anhydrides, esters and acyl halides. Trioctylphosphine oxide is especially interesting.

The amount of capping ligand included in the reaction system can vary widely and basically any amount can be used. In general, 1 to 10,000 mol %, based on the trivalent gallium or other Group IIIA metal in the system, can be used. Concentrations on the order of 5 to 500 or even 20 to 200 mol %, based on the gallium or analogous metal reactant in the system, are more interesting.

The effectiveness of the capping ligand depends at least in part on the reaction temperature, since higher temperatures tend to drive the ligand off the GaN particle surfaces. Therefore, due regard should be paid to the anticipated reaction temperature to be used in a particular embodiment of the invention when selecting the capping ligand for this embodiment.

Atmosphere

To reduce potential adverse reactions, it is desirable to carry out the inventive reaction in an inert atmosphere such as argon or nitrogen, or at least in a reaction system in which access to the atmosphere is substantially restricted such as in a closed vessel, for example. However, this is not absolutely necessary.

Reaction Temperature

The inventive process can be carried out at essentially any temperature at which the reactants, accelerating liquid and product will not decompose excessively. For example, reaction temperature of about −20° C. to +450° C. can be used. In general, higher reaction temperature lead to shorter reaction times, although reaction temperatures above the boiling point of the solvent, accelerating liquid or capping ligand will require a closed system. Conversely, lower temperatures lead to longer reaction times and may require power expenditures for cooling the reaction temperature below room temperature.

As indicated above, a particular advantage of the present invention is that it allows the metathesis reaction to proceed to completion over relatively short periods of time at relatively low temperatures. To this end, reaction temperature of about or slightly below room temperature to the boiling point of the lowest boiling ingredient in the system are convenient. When diethyl ether is the liquid accelerant, this means that the reaction can conveniently be carried out at about 20° C. to 35° C.

Product Annealing

In accordance with another feature of the invention, it has been found that the product GaN particles in terms of size and phase structure can be affected by heating the particles, during and after formation, at elevated temperature (i.e. "annealing").

As indicated above, the GaN particles which form in the inventive metathesis reaction are initially small but normally grow or agglomerate as the reaction proceeds. To this end, larger particles can be obtained in accordance with one feature of the invention by carrying out the inventive process at higher temperatures and/or maintaining these particles at such elevated temperatures for an extended period of time after they are formed.

In addition, GaN is known to exist in a number of different crystalline phases include a cubic phase, known as "zincblende," a hexagonal phase known as "wurtzite" and another cubic phase known as "rocksalt." When product GaN nanoparticles formed by the inventive metathesis reaction, they are normally in the cubic zincblende phase, initially. However, as they are heated at elevated temperatures, they slowly transition to the hexagonal wurtzite phase. Thus, the desired phase structure of the GaN particle product, zincblende or wurtzite, can also be affected by reaction temperature and/or annealing conditions.

Annealing can be carried out at temperatures as high as 1000° C. or even higher and for times as short as 10 minutes and as long as 10 days or longer. Annealing temperatures of about 250° C. to 1000° C., more typically about 300° C. to 850° C., and annealing times of about 1 to 5, more typically about 2 to 4, hours are more typical.

WORKING EXAMPLES

In order to more thoroughly illustrate the invention, the following working examples are presented. In these examples, colloidal GaN nanoparticles were prepared by the inventive process and then analyzed by a variety or different techniques to determine their properties.

Examples 1-7

GaN crystals were prepared by the inventive process by combining 1.0 gm $GaCl_3$ and 0.2 gm $Li_3N$ in 50 milliliters of liquid medium and allowed to react at 23° C. for 48 hours. Two different batches were synthesized for each example, with the gross reaction products obtained from each batch being split into multiple portions to test the effects of annealing. Following the reaction, the solid GaN crystals were isolated by evaporating the liquid medium under vacuum at room temperature. Some portions of the isolated solid material were tested as is (referred to as "as-prepared"), while other portions were subjected to a post-preparative anneal by maintaining them at a specified, elevated temperature for a period of time. The liquid medium used in the reaction, the annealing temperature and the annealing time for each batch are set forth in the following Table 1, in which percents refer to volume percents and "ether" refers to diethyl ether.

TABLE 1

Reaction & Annealing Conditions

| | | Annealing Conditions | | |
|---|---|---|---|---|
| Ex | Liquid Reaction Medium | Anneal Time, hrs | Temp, ° C. | Atmosphere |
| 1 | 50% benzene/50% ether | | no anneal | |
| 2 | 50% benzene/50% ether | 3 | 350 | vacuum |
| 3 | 50% benzene/50% ether | 3 | 850 | vacuum |
| 4 | ether | | no anneal | |
| 5 | ether | 5 | 320 | vacuum |
| 6 | ether | 3 | 750 | vacuum |
| 7* | ether | 5 min. | flame | argon |

The as-prepared product was annealed by recovering the GaN particles from the reaction mixture by centrifugation. The recovered solid was then placed in a quartz tube that was connected to a Schlenk line containing with ultra-high purity argon gas and the quartz tube was heated over an open flame for the specified time.

These samples were then subjected to a variety of different analytical tests, as further discussed below. X-ray diffraction measurements and Raman spectroscopic measurements were made directly on the obtained GaN powder. For those analytical tests requiring measurement in liquid suspension (e.g. photoluminescence), or preparation from a liquid suspension (e.g. TEM imaging), the GaN powder was suspended in methanol.

In a first analytical test, powder x-ray diffraction measurements were made on the GaN product of each of the above working examples were using a Rigaku Geigerflex x-ray diffractometer. As shown in FIG. 1, the two unannealed products (Examples 1 and 4) revealed two broad peaks centered at 35° and 62°. These broad, featureless peaks are typical of nanosized domains or even amorphous material, and the diffraction pattern qualitatively matched those obtained by other workers from nanocrystalline GaN. See, the above-noted Wallace et al. article (*Appl. Phys. Lett.* 1998, 72, 596); the above-noted Wells et al. article (*Eur. J. Solid. State Inorg. Chem.* 1996, 33, 1079); Grocholl et al., *Chem. Mater.* 2001, 13, 4290; and Wang et al. *Nano Letters* 2002, 2, 899. High temperature annealing of the product under vacuum (Examples 2, 3, 5 and 6) yielded narrower peaks that permitted unambiguous identification of the powder as GaN. The effect of annealing appears qualitatively similar, whether the liquid reaction medium is benzene/ether (Examples 2 and 3) or pure ether (Examples 5 and 6), though the pure ether samples tended to have higher proportions of zincblende phase throughout the anneal. Three-hour anneals (Examples 2, 3 and 6) produced mixed phases, with increasing wurtzite contributions appearing with higher temperature annealing (Examples 3 and 6). Annealing at 850° C. (Example 3) produced almost exclusively wurtzite phase. In contrast, a 5 minute flame anneal under argon (Example 7) yielded primarily the metastable zincblende phase with little wurtzite phase present. This study demonstrates the feasibility of selecting the desired phase through reaction and annealing conditions. At high temperatures, annealing initially produces zincblende GaN, but continued annealing is accompanied by a slow cubic-to-hexagonal phase transition.

Example 8

Examples 4-7 were repeated except that the GaN nanoparticles were annealed at 310° C. for 3 hours.

The GaN nanoparticles obtained in this example, as well as the GaN nanoparticles recovered from an additional portion of the reaction product of Example 4, were subjected to Raman spectroscopy. This was done with a WITec Instruments Raman microscope using nonresonant excitation at a wavelength of 532 nm.

Figure 2:
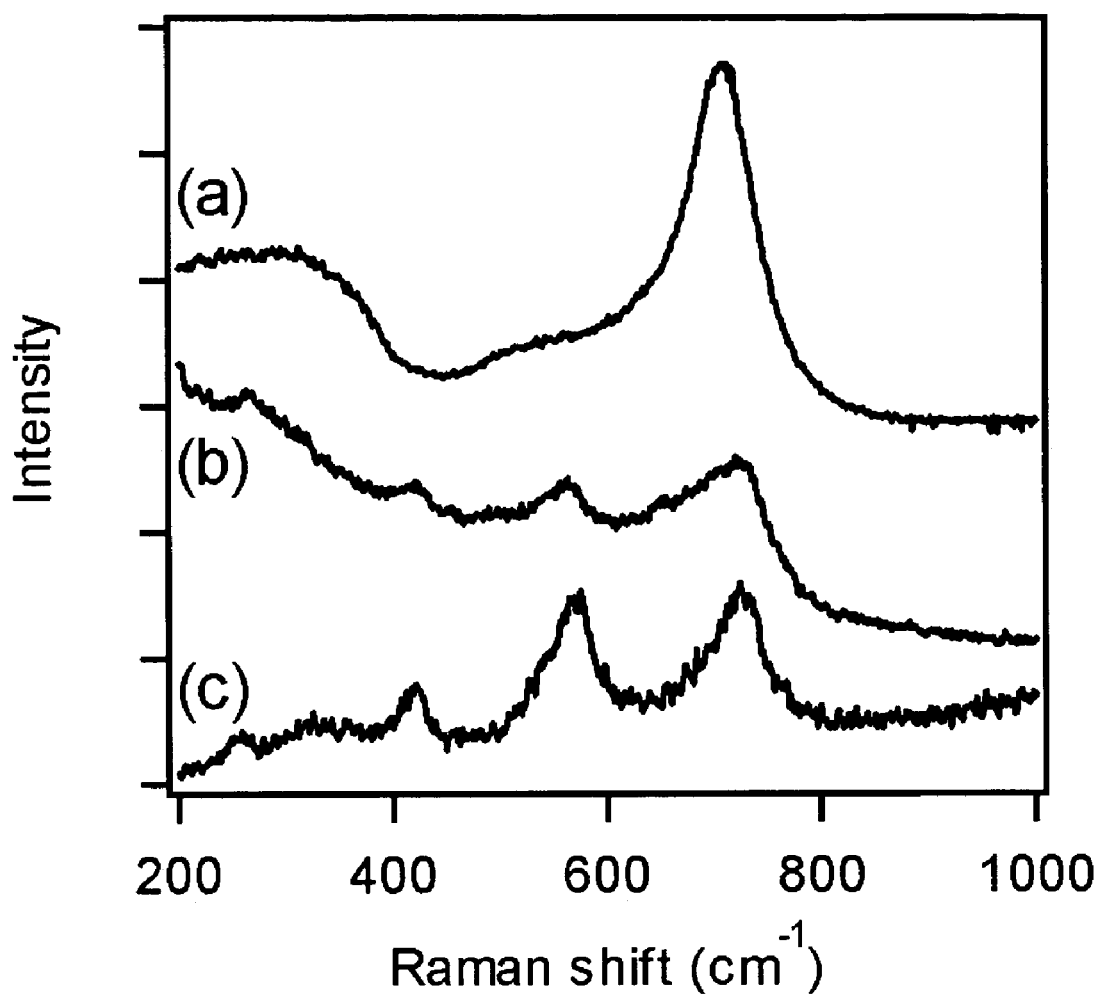
FIG. 2 illustrates the Raman spectra of two GaN nanopowders produced in accordance with the invention as well as a commercially available GaN powder.

FIG. 2 shows the Raman spectrum of (a) the as-prepared sample, (Example 4) (b) the product of Example 8 and (c) a commercially obtained 99.99% GaN powder. As can be seen from this figure, the spectrum of the as-prepared powder (Example 4) as represented by curve "a" exhibits an intense peak at 713 $cm^{-1}$, accompanied by a shoulder on the low energy side and a broad hump near 300 $cm^{-1}$. In the annealed powder (Example 8, curve "b"), however, this peak (713 $cm^{-1}$) has shifted ~20 $cm^{-1}$ higher while the shoulder narrows into a distinct peak near 570 $cm^{-1}$. Although the peaks in curve (b) remain broad (due to small crystallite size and some remaining disorder), the four main features can all be assigned to known GaN modes. The peak at 730 $cm^{-1}$ is the longitudinal $A_1$ mode, and the peak at 570 $cm^{-1}$ contains contributions from both the transverse $E_1$ mode and the high frequency $E_2$ mode. Finally, the two peaks near 250 $cm^{-1}$ and 420 $cm^{-1}$ are ascribed to a zone boundary phonon and acoustic overtones, respectively, in accordance with previous assignments. See, Xu et al., *Adv. Funct. Mater.* 2004, 14, 464; Liu et al., *Chem. Phys. Lett.* 2001, 345, 245; Zhang et al, *J. Phys. D: Appl. Phys.* 2002, 35, 1481; and Trodahl et al., *J. Appl. Phys.* 2005, 97, 084309.

Additional characterizations of the GaN products described above were done by photoluminescence emission and TEM measurements. For this purpose, the GaN particles were recovered in methanol solutions in the same manner as described above in connection with Example 8 from additional 10 ml aliquots of the respective reaction products.

Figures 3A, 3B:
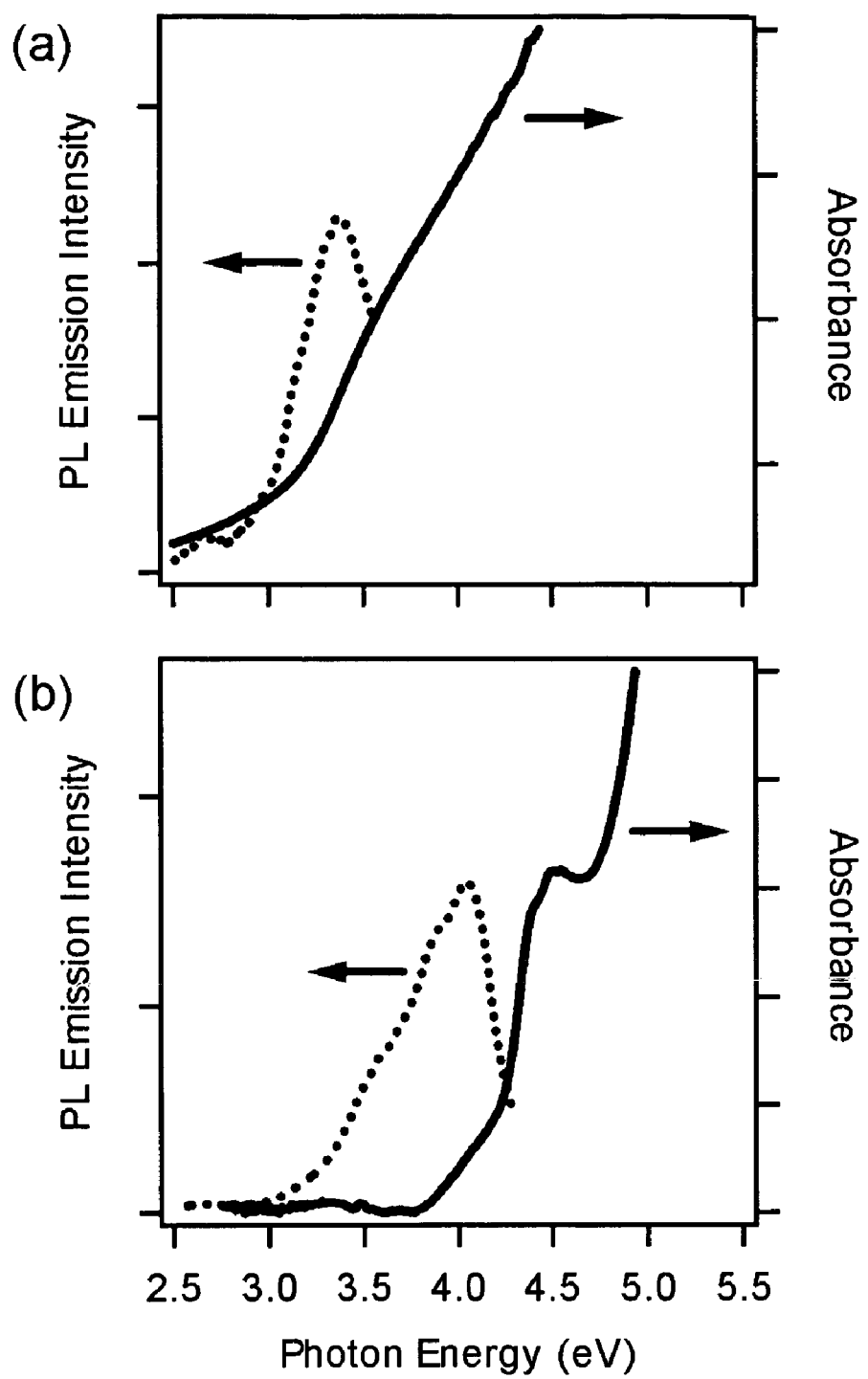
FIG. 3 illustrates the optical spectra of two GaN nanopowders produced by the present invention.

FIG. 3(*a*) shows the UV absorption and PL emission spectra (320 nm excitation) of the GaN nanopowder produced in Example 8 (prepared in pure ether and annealed at 310° C. for 3 hours), while FIG. 3(*b*) shows the UV absorption and PL emission spectra (320 nm excitation) of the GaN nanopowder produced in Example 4 (unannealed sample prepared in pure ether). Both show strong bandgap photoluminescence (PL) emissions with negligible emission from trap states.

Thus, the emission peak in FIG. 3(*a*) (Example 8) appears at the GaN bandgap energy, 3.4 eV. A second peak due to trap state emission is observed at 2.65 eV (468 nm), but this peak is less than one tenth the intensity of the main bandedge emission peak. FIG. 3(*b*), meanwhile, shows the UV absorption and PL emission spectra (320 nm excitation) of the GaN nanopowder produced in Example 4 (unannealed sample prepared in pure ether). FIG. 3(*b*) (Example 4) shows a strongly blue-shifted PL emission at 4.04 eV (307 nm) with peak shape similar to that observed in the annealed sample. This blue-shifted PL peak provides evidence for quantum confinement in these samples and suggests the possibility of adapting this reaction for production of GaN quantum dots. The UV absorption spectrum of the as-prepared suspension (also shown in 3(*b*)) shows a blue-shifted absorption edge, also characteristic of electronic quantum confinement.

Figure 4:
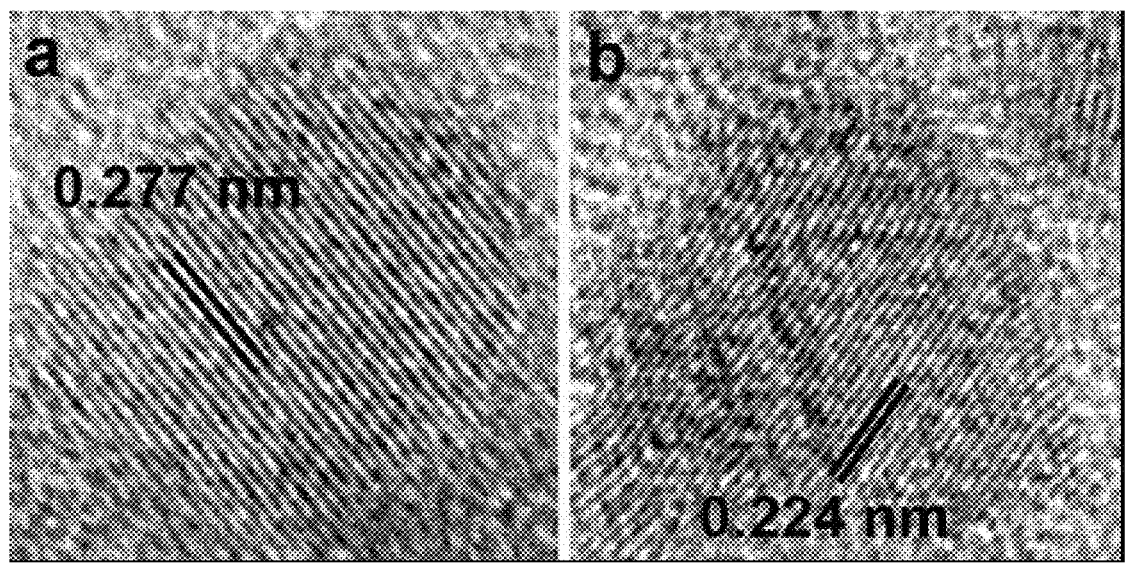
FIG. 4 are two views illustrating an HRTEM image of a GaN nanocrystal produced in accordance with the present invention being superimposed on the lattice spacings of wurtzite GaN and zincblende GaN for comparison purposes.

FIG. 4 shows the high resolution transmission electron microscopy (HRTEM) image produced by the GaN particles of Example 8 (annealed at 310° C. in pure ether) produced in a Phillips 2000 high resolution transmission electron microscope, this image being superimposed over the (100) plane spacings of wurtzite GaN crystals (FIG. 4(*a*)) and the (200) plane spacings of zincblende GaN crystals (FIG. 4(*b*)). FIG. 4 reveals nanosized crystals of differing phases averaging approximately 10 nm in diameter. Many crystals were also found with lattice spacings of 0.260 nm, which is consistent with both the (002) spacing of wurtzite GaN and the (111) spacing of zincblende GaN. No spacings consistent with the rocksalt form of GaN were found in these HRTEM images.

Imaging of the two unannealed samples (Examples 1 and 4) was attempted with little success. The low contrast produced by nanoparticles of GaN combined with the amorphous nature of the unannealed particles made it difficult to identify with any confidence the GaN product under the TEM.

Nonetheless, the above data also shows strong electronic quantum confinement in the as-prepared particles, which is unexpected since no surface capping ligand was added to restrict particle growth. The most likely explanation for the observed quantum confinement is that the simultaneous formation of LiCl and GaN bonds in close proximity at the surface results in the formation of nanodomains of GaN that are entirely surrounded by LiCl, thus giving rise to the quantum-confined PL emission in the as-prepared product. Absent any capping ligand in the mixture, the most likely protective cap on the GaN particles is LiCl. HRTEM images of samples that were annealed at 300° C. without removing LiCl showed numerous examples of adjacent GaN and LiCl domains.

From the above, it can be seen that the inventive metathesis reaction provides a new route to GaN nanocrystals which is a significant improvement over the previously reported similar metathesis reactions. While earlier metathesis reactions have been previously studied by others, the catalytic nature of diethyl ether reported here represents a significant advance in the production of GaN powders. The ether bath regulates the reaction temperature so that product decomposition is avoided, yet unlike other solvents and additives the ether does not completely quench the reaction or compromise yield. This method appears to be the most practical yet reported for synthesis of nanocrystalline GaN. It should permit easy scale-up and may eventually be adapted for production of colloidal GaN quantum dots.

Although only a few embodiments of the present invention have been described above, it should be appreciated that many modifications can be made without departing from the spirit and scope of the invention. All such modifications are intended to be included within the scope of the present invention, which is to be limited only by the following claims.

The invention claimed is:

1. A process for producing a metal nitride product by the metathesis of a metal nitride reactant and a reactant salt of a monovalent anion and the metal forming the metal nitride product, the metal nitride reactant and the reactant salt being at least partially dissolved in a liquid reaction medium, wherein the metal forming the metal nitride product is selected from the group consisting of metals of Groups IIIA, IIIB, IVB, VB and VIB of the Periodic Table while the metal forming the metal nitride reactant is selected from the group consisting of metals of Groups IA and IIA of the Periodic Table,
wherein the liquid reaction medium includes a liquid accelerant comprising an ether having a single ether moiety, an ether having multiple ether functionalities in which adjacent ether groups are separated by at least 4 carbon atoms, or mixtures thereof.

2. The process of claim 1, wherein a gallium salt is reacted to form gallium nitride.

3. The process of claim 2, wherein the gallium salt is a gallium halide.

4. The process of claim 3, wherein the metal nitride reactant is formed from a Group IA metal.

5. The process of claim 4, wherein gallium chloride, gallium bromide, gallium iodide or mixture thereof is reacted with lithium nitride, sodium nitride, potassium nitride or mixture thereof.

6. The process of claim 5, wherein gallium chloride or gallium iodide is reacted with lithium nitride.

7. The process of claim 1, wherein the liquid accelerant is an ether having a single ether moiety.

8. The process of claim 7, wherein the ether has 2-30 carbon atoms and is a dialkyl ether, a diaryl ether, an alkyl aryl ether or a mixture of such ethers, the ether or ethers being unsubstituted, mono-substituted, or poly-substituted with a non-reactive substituent selected from the group consisting of chloro, bromo, fluoro, nitro, hydroxy, alkoxy, ester, aldehyde, ketone, and amino.

9. The process of claim 8, wherein the ether is unsubstituted.

10. The process of claim 9, wherein the ether is selected from the group consisting of dialkyl ether in which each alkyl group has 1-6 carbon atoms, dibenyzl ether, xylyl benzyl ether, methyl benzyl ether, propyl benzyl ether, butyl benzyl ether, pentyl benzyl ether, hexyl benzyl ether and mixtures thereof.

11. The process of claim 10, wherein the ether is a dialkyl ether.

12. The process of claim 11, wherein the ether is diethyl ether.

13. The process of claim 1, wherein the liquid reaction medium also includes a capping ligand.

14. The process of claim 13, wherein the capping ligand is a Lewis base.

15. The process of claim 14, wherein the capping ligand is a thiol, amine, amide, alcohol, diol, disulfide, aldehyde, ketone, carboxylic acid anhydride, carboxylic acid ester, acyl halide or a mixture thereof.

16. The process of claim 1, further comprising annealing the metal nitride product by heating the liquid reaction medium in which it is contained to a temperature of about 250° C. to 1000° C. for 10 minutes to 10 days.

17. The process of claim 16, wherein the metal nitride product is heated to about 300° C. to 850° C.

18. The process of claim 16, wherein the metal nitride product is heated long enough to transition its phase structure from substantially zincblende to substantially wurtzite.

* * * * *